United States Patent [19]
Cooper

[11] Patent Number: 6,011,462
[45] Date of Patent: Jan. 4, 2000

[54] TIRE PRESSURE MONITOR

[76] Inventor: Jimmy K. Cooper, 4344 Langley Ave., Apt. 215D, Pensacola, Fla. 32504

[21] Appl. No.: 09/184,524

[22] Filed: Nov. 2, 1998

[51] Int. Cl.⁷ .................................................. B60C 23/02
[52] U.S. Cl. ........................ 340/442; 340/447; 340/448; 73/146.5; 200/61.22
[58] Field of Search .................................. 340/442, 445, 340/447, 539, 448; 116/34 R; 73/146.5, 146.8, 146.4; 200/61.22

[56]  References Cited

U.S. PATENT DOCUMENTS

| | | | |
|---|---|---|---|
| 3,938,078 | 2/1976 | Davis et al. | 340/58 |
| 3,982,225 | 9/1976 | Schlanzky | 340/442 |
| 4,050,823 | 9/1977 | Martin et al. | 340/58 |
| 4,090,172 | 5/1978 | Vesnic | 340/448 |
| 4,726,223 | 2/1988 | Huang | 73/146.8 |
| 4,898,216 | 2/1990 | Schultz et al. | 141/4 |
| 4,945,337 | 7/1990 | Huang | 340/442 |
| 4,954,806 | 9/1990 | Hwang | 340/442 |
| 5,025,244 | 6/1991 | Huang | 340/442 |
| 5,109,213 | 4/1992 | Williams | 340/447 |
| 5,289,161 | 2/1994 | Huang | 340/447 |
| 5,505,080 | 4/1996 | McGhee | 73/146.5 |
| 5,557,256 | 9/1996 | Achterholt | 340/442 |

*Primary Examiner*—Edward Lefkowitz
*Assistant Examiner*—Davetta Woods
*Attorney, Agent, or Firm*—Keaty Professional Law Corporation

[57]  ABSTRACT

A tire pressure indicator has a spring-operated sensor mounted in an air chamber of a housing that attaches to a tire pressure valve. Indicator has adjustment screws, accessible from the exterior of the housing, for setting the sensor to a low level of acceptable tire pressure and a high level of acceptable tire pressure. When the pressure level outside of the set limits is detected, a bicolor light emitting diode provides a warning to a driver.

16 Claims, 4 Drawing Sheets

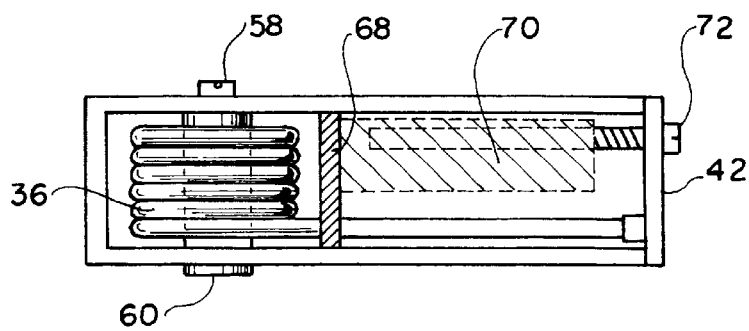
F I G. 5
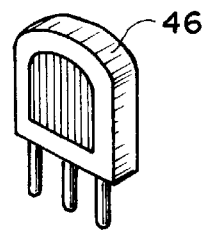
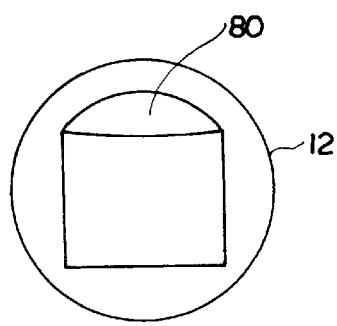
F I G. 7
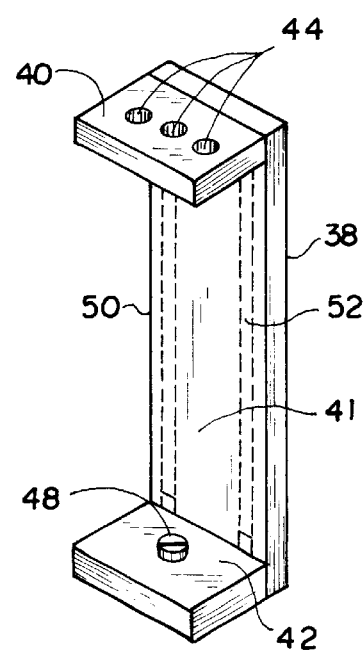
F I G. 6
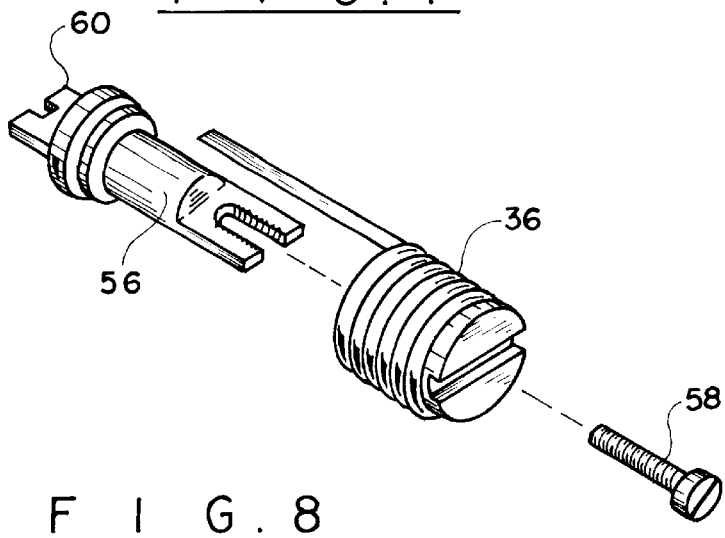
F I G. 8

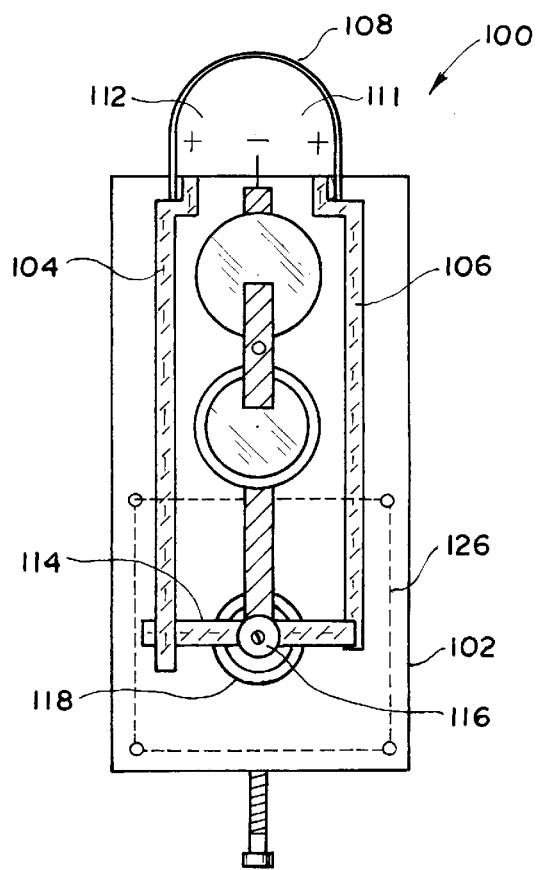
FIG. 9
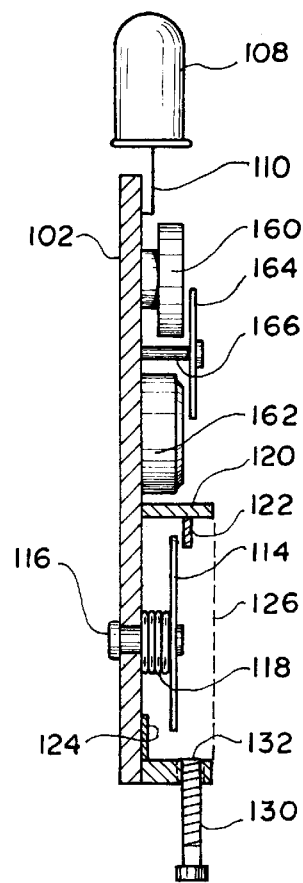
FIG. 10
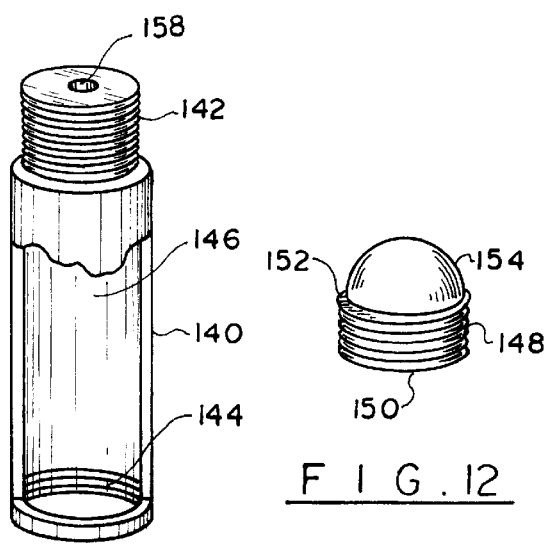
FIG. 11
FIG. 12
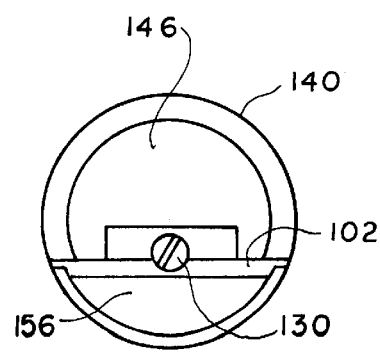
FIG. 13

TIRE PRESSURE MONITOR

BACKGROUND OF THE INVENTION

The invention relates to a pressure monitor, and more particularly a device for monitoring tire pressure in tires equipped with a pressure valve.

It is conventional for tire manufacturers to provide information on the most efficient tire use in order to extend the life of the tires, as well as improve gas mileage of cars, trucks and other vehicles. When the tire pressure drops below a normal level, gas mileage is adversely affected. If the high pressure is higher than the recommended limit, the tire may explode, causing property damage and possible injuries to people. Experienced drivers routinely check the tire pressure to make sure that it is within the recommended level.

The procedure usually involves the use of a pressure gauge that is manually connected to the valve of the tire and reading of the indicia on a pop-up pressure gauge stem. When the pressure is below the required level, the driver would add air into the tire to inflate it to the desired level. If the pressure exceeds the recommended limit, the tire might be deflated to reach the necessary internal pressure. Such a procedure is time consuming since every tire has to be checked for compliance with the manufacturer's instructions.

In order to simplify the procedure, the industry has developed various tire pressure indicators that are designed for attachment to the tire pressure valves for continuous monitoring of the status of the tire pressure. One such indicator is disclosed in U.S. Pat. No. 3,938,078 issued on Feb. 10, 1976 to Davis et al. In that patent, the unit is directly connectable to the valve stem of a car tire. When activated, the unit can be seen by the driver through suitably adjusted side mirrors. The device has a plunger that fits into and can open the tire pressure valve. A piston contacts a compression spring to close an electrical circuit (powered by a battery) and extinguish the light bulb. A tube filled with liquid is mounted between the plunger piston and the second piston. When fluid pressure from the tire is escaping, it moves the plunger piston against the second piston to operate the compression spring and close the circuit.

Another tire pressure indicator is disclosed in U.S. Pat. No. 4,059,823 issued on Nov. 22, 1977 to Martin et al. This device not only gives visual indication when the tire pressure is low by energizing a light bulb, but also provides a scale to indicate the extent of under- or over-inflation of the tire.

U.S. Pat. No. 4,726,223 issued on Feb. 23, 1988 to Huang provides for an alarm, audible or visual to give a signal when the tire is under inflated. U.S. Pat. No. 5,025,244 issued on Jun. 18, 1991 to Huang discloses a device that uses a piston with a mercury cell, with a positive end of the cell being in contact with the positive end of a light bulb. A pressure spring keeps the mercury cell in contact with the light bulb. A sliding member is placed under a lower end of the pressure spring. The tire pressure causes the spring to be either compressed or released to turn the light bulb on or off.

U.S. Pat. No. 5,289,161 issued on Feb. 22, 1994 to Huang discloses the use of a diaphragm that is positioned in the casing near an air inlet of the pressure gauge. The diaphragm moves in response to air pressure entering the casing from the tire. A spring-loaded push rod moves inside the casing in response to a movement from the diaphragm, which, in turn, activates signal switches mounted in the casing.

U.S. Pat. No. 5,557,256 issued on Sep. 17, 1996 to Achterholt shows a valve cap with a diaphragm mounted in an inner housing of the pressure chamber. A reference pressure chamber is used to compare with the tire pressure and, when the tire pressure drops below the predetermined level, to deflect the diaphragm. A permanent magnet is placed on the diaphragm. A hand-held pressure checking device also has a magnet, and when brought in proximity to the valve cap, indicates position of the magnet inside.

While these devices work satisfactorily under many conditions, some of them are too complicated and inefficient, while others are not well designed to withstand a continuous vibration associated with a moving vehicle. As a result, there exists a need for a simple, easy to use tire pressure monitor that can be easily calibrated to indicate low pressure or above the limit pressure in the tires.

SUMMARY OF THE INVENTION

It is, therefore, an object of the present invention to provide an easy to use tire pressure monitor.

It is another object of the present invention to provide a tire pressure indicator that can be detachably connected to a tire of a car or a truck.

It is a further object of the present invention to provide a pressure monitor for tires that can be adjusted and calibrated to indicate low pressure, as well as high pressure.

These and other objects of the present invention are achieved through a provision of a device for indicating an abnormal level of tire pressure. The device has a spring-operated sensor mounted in an air chamber of a housing that attaches to a tire pressure valve. A pair of adjustment screws, one for low pressure and another—for high pressure, extend into the housing to act on the compression spring of the sensor. Both adjustment screws are accessible from an exterior of the housing to allow calibration of the monitor either in a factory setting or by hand after the unit is sold to a customer.

One of the embodiments uses an inflatable sleeve for pushing on the compression spring in response to the change in the tire pressure. Another embodiment uses a pair of contact member operationally connected to the compression spring through a contact plate. Both embodiments use a bicolor light emitting diode that displays one color when the pressure is too low, and another color—when the pressure is too high. Both embodiments use batteries for continuous use when the device is mounted on a tire.

BRIEF DESCRIPTION OF THE DRAWINGS

Reference will now be made to the drawings, wherein like parts are designated by like numerals and wherein

FIG. 2 is a front view of the first embodiment of the present invention, with the wall being cut away from clarity.

FIG. 5 is a top view of the pressure sensor compartment.

FIG. 6 is a detail view of a printed circuit board of the first embodiment of the present invention, showing an opening for a high pressure adjustment screw and plurality of opening for receipt of light emitting diode.

FIG. 7 is a detail top view of an air chamber showing an inflatable sleeve.

FIG. 8 is a detail view showing compression spring with a locking screw and adjustment head.

FIG. 9 is a side view, with the front wall cut away, of the second embodiment of the pressure indicator in accordance with the present invention.

FIG. 10 is a detail side view showing the pressure sensor of the second embodiment.

FIG. 11 is a perspective view of the housing of the device shown in FIGS. 9 and 10.

FIG. 12 is a cap of the second embodiment of the present invention designed for attachment to the housing.

FIG. 13 is a top view showing an air chamber and a pressure sensor chamber.

DETAILED DESCRIPTION OF PREFERRED EMBODIMENT

Figure 1:
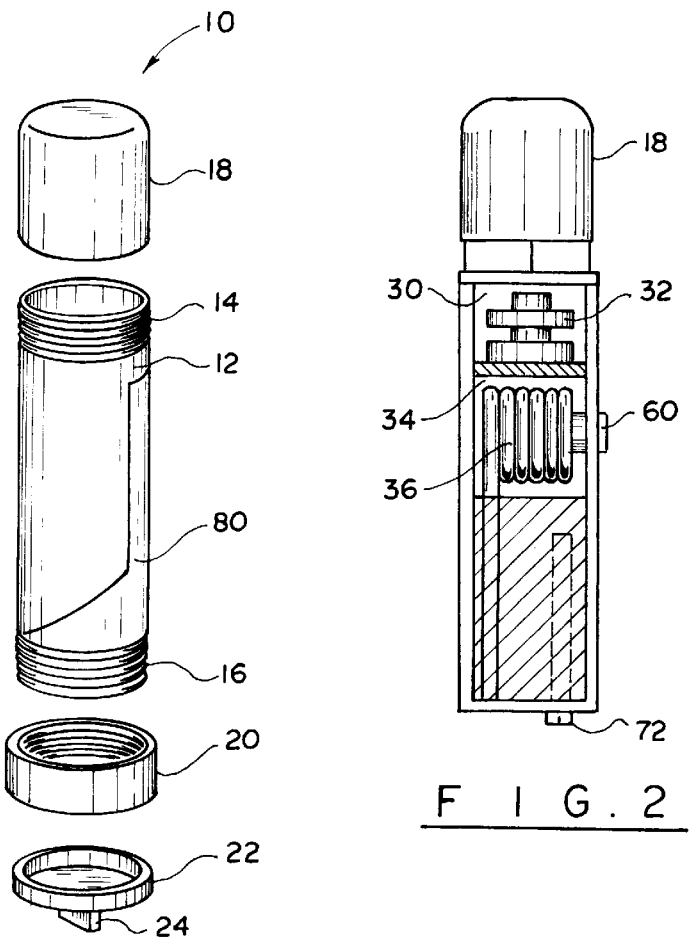
FIG. 1 is a perspective view of tire pressure monitor in accordance with the present invention.
Figure 3:
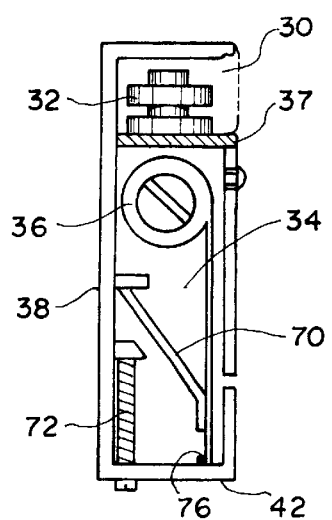
FIG. 3 is a side view of the unit of FIGS. 1 and 2, showing pressure sensor with a compression spring.

Turning now to the drawings in more detail, numeral 10 designates the tire pressure indicator in accordance with the first embodiment of the present invention. As shown in the drawings, the device comprises a hollow housing 12 provided with external threads 14 and 16 in the upper and lower portions of the housing, respectively. Threadably attached to the upper portion by threads 14 is a cap 18, which is made of transparent or clear non-corrosive material, such as plastic.

Threadably attached to the lower part of the housing 12 by threads 16 is an attachment collar 20 which is internally threaded for securing on a valve stem of a tire pressure valve. A depression plate 22 with a downwardly extending pin 24 is secured to the collar 20. The depression member 22 is designed to depress the valve stem of a conventional tire pressure valve.

The hollow housing 12 is divided into a plurality of compartments. The uppermost compartment is designated by numeral 30; it is designed to house a battery pack, which can be composed of 1.5–3 volt lithium batteries designated by numeral 32 in the drawings. Formed below the battery compartment 30 is a pressure sensor compartment 34 which houses a compression spring 36. The compartments 30 and 34 are united by a printed circuit board 38 that is formed by a rectangular plate 41 extending vertically in the housing 10 and a pair of transverse plates 40 and 42.

The transverse plate 40 is formed with a plurality of openings 44 designed to receive prongs of a bicolor light emitting diode (LED) 46. The transverse plate 42 is provided with one opening 48, which is adapted to receive an adjustment screw, as will be explained in more detail hereinafter. A pair of tracks 50, 52 are soldered on the inner surface of the plate 40 to provide electrical connection between the compression spring and the LED 46.

Detachably secured to the compression spring 36 is an adjustment member 56 which is fitted in the center of the compression spring between the coils and is secured in place by a locking screw 58 fitted from the opposite end of the compression spring. The adjusting member 56, as shown in FIG. 8, has an adjustment head 60 that can be engaged by a screwdriver for calibration of the device 10 to indicate low pressure. The adjustment head 60 extends outwardly from the wall of the compartment 34, as can be seen in FIGS. 2 and 5, and allows adjustment or calibration of the device 10 from an exterior of the housing 12.

Figure 4:
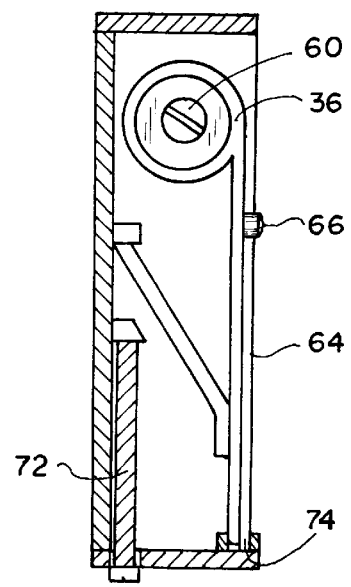
FIG. 4 is an opposite side view of a pressure sensor compartment.

A hinged lid 64 allows access to the compartment within the housing 12 where the compression spring 36 is mounted. The lid is hinged at 66, as can be better seen in FIG. 4. A tension stop 68 (FIG. 5) serves as a means for limiting sliding movement of a high pressure adjustment plate 70.

An adjustment screw for high pressure 72 is fitted into the transverse plate 42 and extends into the pressure sensor compartment 34. Two contact points are made in the pressure sensor compartment; one contact point 74 (FIG. 4) serves as a low pressure contact. A similar contact point is made for excessive high pressure within the tire.

Mounted inside the housing 12 is an inflatable tube, or sleeve 80 that surrounds the sensor elements in a manner shown in FIG. 7. When the pressure indicator 10 is mounted on the valve stem of the tire, air is released into the air chamber 80 inside the housing 12 to inflate the sleeve 80.

The inflatable sleeve is generally positioned above the pressure sensor and fills with air from the tire as the unit is mounted on the valve stem of the tire. As the sleeve pushes down on the spring 36, the spring facilitates movement of the sensor element into the position ready for accepting decrease or increase in value of the tire pressure.

As the pressure changes, the compression spring 36 and a flat lid 37 above the spring moves in the pressure chamber. The adjustment screw 56 is connected through the side of the housing 12 to hold the inner portion of the spring in place. As the screw is turned, it strengthens the tension on the lid 37 allowing calibration of the monitor 10 for low pressure settings.

The high pressure adjustment screw 72 pushes on the sliding plate 70, allowing to set the compression of the spring 36 to the desired high pressure settings. After the desired settings are achieved, both spring adjustment screws 56 and 72 are locked in place.

The batteries 32 are connected to the bicolor LED 46 and make a contact with the lid 37. The pressure spring 36 makes a contact at point 74, which completes the electrical circuit to the positive side of the LED unit. If the pressure in the tire on which the unit 10 is mounted drops below a set point, a circuit is completed through the upper contact point in the lid 37 which causes the LED unit to be illuminated in one color. When the pressure exceeds the predetermined limit, the pressure spring completes the circuit with the point 76 in the lower part of the pressure sensor compartment and the bottom of the lid 37.

The negative side of the LED 46 is in contact with the battery compartment, while the positive side is in contact with the pressure sensor. One color is selected to display low pressure, and another color is selected to display excessive pressure. If the pressure inside the tire is within the allowable limits, LED will not be illuminated at all.

The unit 10 remains mounted on a tire pressure valve, and can be removed for replacement of batteries during tire rotation or changing of tires.

It is preferred that the outer walls of the housing 12 be made from pressure-resistant material suitable to withstand the pressure traveling through the compartment for operation of the unit. The cap 18 can be made either unitary connected to the LED indicator or separate, enclosing the LED indicator. In the latter case, the cap is preferably made of transparent, clear material, allowing an operator to see the change in color of the LED 46.

Turning now to FIGS. 9–16, the second embodiment of the present invention is designated by numeral 100. This embodiment uses a printed circuit board 102 that is provided with a pair of soldiered tracks 104 and 106. The tracks 104 and 106 lead to the bicolor light emitting diode (LED) 108 connectable to the printed circuit board 102 by a plurality of prongs 110 in order to establish electrical connection to the LED and facilitate illumination thereof when low or high pressure is detected in the tire.

When the low pressure in the tire is detected, the low pressure side 112 of the LED is illuminated. When an excessive high pressure is detected the LED side 111 is illuminated with a different color through connection with the track 106. The tracks 104 and 106 extend through substantially entire length of the printed circuit board 102.

A contact plate 114 is mounted on an adjustment screw 116 that extends through the circuit board (see FIG. 10) and is securely attached thereto. The space formed between the contact plate 114 and the circuit board 116 is used for positioning of a pressure spring 118. The spring 118 urges against the surface of the plate 114 by either upper end for contact with a low pressure contact member 120 or by a lower part for contact with a high pressure 122.

The low pressure contact member 120 has a T-shaped configuration with a portion thereof being fixedly attached and extending transversely to the printed circuit board 102 and a contact finger 122 extending in parallel relationship to the board 102, downwardly from the transverse portion. The contact plate member 114 extends upwardly to at least a point of contact with the finger 122 for establishing an electrical contact between the contact pressure member 120 and the light emitting diode 108 when the pressure falls below a predetermined level.

A high-pressure contact member 124 is positioned on an opposite side of the adjustment screw 116, and has a portion that extends in a parallel relationship to the plate 114. The plate 114 contacts the member 124 when the pressure exceeds the set value. The pressure sensor members are covered with an electrically non-conductive covering, such as a flexible rubber cover 126, shown in phantom lines in FIGS. 9 and 10. A pair of brackets 127 (FIG. 16) are secured to the printed circuit board 102 to allow positioning of the flexible cover 126 over the pressure sensor assembly.

A depressible plunger 130 extends through a plate 132 in the bottom of the unit 10. The plunger 130 is depressed by the valve stem of a pressure valve on a tire (not shown).

Similarly to the first embodiment in FIGS. 1–8, the pressure sensor operating members are positioned in a housing 140 that is provided with external threads 142 in the upper end thereof and with internal threads 144 in the lower end thereof. An air chamber 146 is formed inside the hollow housing 140. A cap 148 (FIG. 12) has internal threads 150 for attachment to the threads 142 of the housing 140.

An O-ring seal 152 is mounted inside the cap 148 for sealing the air chamber 146 near the top. The lower portion of the housing 140 may be also provided with an O-ring seal, if desired to make an airtight engagement with the tire pressure valve. A clear top dome 154 is securely positioned above the threaded portion of the cap 148. The dome 154 is made from a clear material, such as shatter-resistant plastic, to allow a driver to see the color on the LED display.

The printed circuit board 102 is positioned inside the air chamber 146 to occupy a position shown in more detail in FIG. 13. A space 156 is formed behind the circuit board 102 for air pressure sensor to operate with the spring and shaft. An opening 158 is formed in the center of the upper portion of the housing 140 to receive the light emitting diode 108.

Similarly to the first embodiment, the embodiment of FIGS. 9–16 is operated by a pair of batteries 160, 162. The batteries are connected to the circuit board 102 by a holder plate 164 secured with a screw, or pin 166. Each battery can be 1.5 or 3 volt lithium battery.

Figure 14:
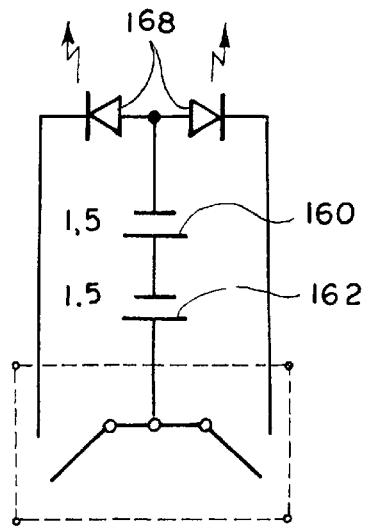
FIG. 14 is a circuit diagram of the second embodiment of the present invention.
Figure 15:
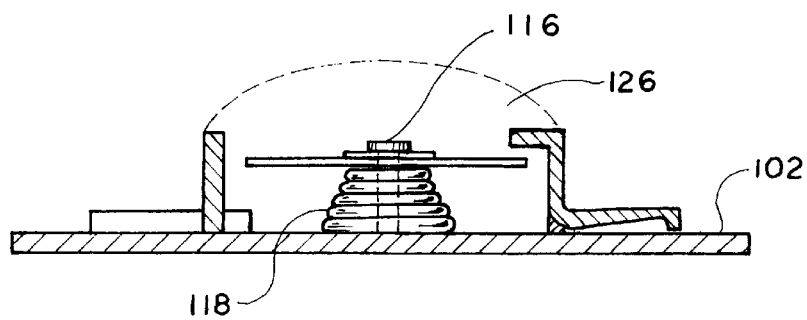
FIG. 15 is a detail side view showing a compression spring with a flexible cover over the pressure sensor.
Figure 16:
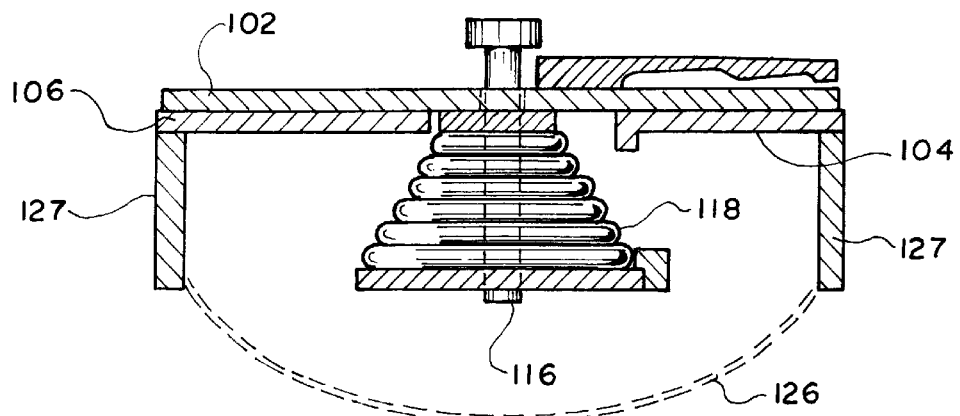
FIG. 16 is a detail view of the pressure sensor, showing brackets for attachment of the flexible cover.

The spring tension can be adjusted with an adjustment screw 116 at a factory and then individually depressed for more tension, depending on the type of tires where the monitors are positioned. As the pressure drops below the factory setting, the spring 118 will force the contact plate 114 into a positive contact with the member 122. This will establish an electrical circuit between the positive side of the battery and one of the sides of the light emitting diode (FIG. 14).

If excessive air pressure is detected in the air chamber 146, the spring 118 is forced downward to make contact with the member 124 and with the second track on the printed circuit board 102. The electrical circuit will cause the other color of the LED to become illuminated. If no changes in the air chamber are detected, the LED will remain in its factory pre-set status, without illuminating any particular color. If necessary, the batteries can be tested and changed each time the tires are rotated or replaced.

The pressure indicators 10 and 100 are easily adjustable; they can be calibrated for accuracy from an exterior of the housings. A simplified construction of the pressure sensor ensures that vibrations and other physical forces acting on the tire will have minimal or no effect on the operation of the sensors. No manual testing of the tire pressure will be required once the monitors 10 or 100 are placed on each tire. The only operation that a driver has to perform is to watch the LED display for any indication of the color changes. If the LED is illuminated, the driver will receive a positive warning to either add more air to the tires or let some air out.

Many changes and modifications can be made in the design of the present invention without departing from the spirit thereof. I, therefore, pray that my rights to the present invention be limited only by the scope of the appended claims.

I claim:

1. A device for indicating abnormal pressure in a tire provided with a pressure valve, the device comprising:

a hollow housing detachably mountable on the tire pressure valve, said housing defining a pressure chamber, said pressure chamber being in direct fluid communication with the tire pressure valve when the housing is mounted on the tire pressure valve; a spring-operated pressure sensor mounted in the housing, said pressure sensor comprising a compression spring, a lid mounted above the compression spring, said lid allowing calibration of the pressure sensor for low pressure settings, and a sliding plate mounted in contact with the compression spring opposite said lid, said sliding plate allowing calibration of the pressure sensor for high pressure settings;

an inflatable sleeve mounted within said housing in contact with said lid for communicating tire pressure to said pressure sensor; and a means operationally connected to the pressure sensor for visually displaying a condition in the tire pressure which is below or above the acceptable level.

2. The device of claim 1, further comprising means for adjusting the pressure sensor to a low pressure level, said low pressure adjusting means comprising further comprising a means for adjusting a first adjustment screw engaging said compression spring, said first adjustment screw being accessible from an exterior of said housing.

3. The device of claim 1, further comprising means for adjusting said pressure sensor to high pressure level, said high pressure adjusting means comprising a second adjustment screw engaging said sliding plate, said second adjustment screw being accessible from an exterior of said housing.

4. The device of claim 1, further comprising a power means for supplying electric power to said display means.

5. The device of claim 1, wherein said display means is a bicolor light emitting diode.

6. The device of claim 1, wherein said pressure sensor comprises a printed circuit board, a compression spring secured on said printed circuit board by an adjustment screw and a contact plate carried by said adjustment screw in abutting relationship to said compression spring.

7. The device of claim 6, wherein said means for adjusting the pressure sensor to a low pressure level comprises a first contact member secured to said printed circuit board adjacent a first end of said contact plate, said first contact member establishing an electrical contact with said contact plate and said display means when the tire pressure drops below a pre-determined level.

8. The device of claim 7, wherein said means for adjusting pressure sensor to a high pressure level comprises a second contact member secured to said printed board adjacent a second end of said contact plate, said second contact member establishing an electrical connection with said contact plate and said display means when the tire pressure exceeds a predetermined level.

9. A device for indicating abnormal pressure in a tire provided with a pressure valve, the device comprising:
  a hollow housing detachably mountable on the tire pressure valve, said housing defining a pressure chamber, said pressure chamber fluidly communicating with the tire pressure valve when the housing is mounted on the tire;
  a spring-operated pressure sensor mounted in the housing, said pressure sensor comprising a compression spring mounted in a compartment within said housing, said compartment having a lid above said compression spring; a sliding plate mounted in said housing below said compression spring, said plate sliding to establish an electrical contact with said lid when an abnormal tire pressure is detected;
  an inflatable sleeve mounted above said lid for exerting a downward pressure on said compression spring, said sleeve being filled with air from the tire when said housing is mounted on said tire;
  a means extending into the pressure chamber for adjusting the pressure sensor to a low level of acceptable tire pressure;
  a means extending into the pressure chamber for adjusting the pressure censor to a high level of acceptable tire pressure; and
  a means operationally connected to the pressure censor for visually displaying a condition in the tire pressure which is below or above the acceptable level.

10. The device of claim 9, wherein said means adjusting the pressure sensor to a low pressure level comprises a first adjustment screw engaging said compression spring, said first adjustment screw being accessible from an exterior of said housing.

11. The device of claim 9, wherein said means for adjusting the pressure sensor to a high pressure level comprises a second adjustment screw extending from a bottom of the pressure sensor chamber for contact with said sliding plate, said second adjustment screw being accessible from an exterior of said housing to allow calibration of the pressure sensor for desired pressure seting.

12. The device of claim 9, further comprising a power means for supplying electric power to said display means.

13. The device of claim 9, wherein said display means is a bicolor light emitting diode.

14. A device for indicating abnormal pressure in a tire provided with a pressure valve, the device comprising:
  a hollow housing detachably mountable on the tire pressure valve, said housing defining a pressure chamber, said pressure chamber fluidly communicating with the tire pressure valve when the housing is mounted on the tire, said pressure sensor comprising a printed circuit board, a compression spring secured on said printed circuit board by an adjustment screw extending transversely through said printed circuit board and a contact plate extending in a substantially parallel relationship to said printed circuit board, said contact plate being carried by said adjustment screw in abutting relationship to said compression spring;
  a means extending into the pressure chamber for adjusting the pressure sensor to a low level of acceptable tire pressure, said means for adjusting the pressure sensor to a low pressure level comprising a first contact member secured to said printed circuit board adjacent a first end of said contact plate, said first contact member establishing an electrical contact with said contact plate and said display means when the tire pressure drops below a pre-determined level and the contact plate moves into a contact with the first contact member;
  a means extending into the pressure chamber for adjusting the pressure sensor to a high level of acceptable tire pressure, said means for adjusting pressure sensor to a high pressure level comprises a second contact member secured to said printed board adjacent a second end of said contact plate, said second contact member establishing an electrical connection with said contact plate and said display means when the tire pressure exceeds a pre-determined level and the contact plate moves into a contact with the second contact member; and
  a means operationally connected to the pressure sensor for visually displaying a condition in the tire pressure which is below or above the acceptable level.

15. The device of claim 13, wherein said display means is a bicolor light emitting diode.

16. The device of claim 14, further comprising a power means for supplying electrical power to said display means.

* * * * *